US010217028B1

(12) United States Patent
Wang et al.

(10) Patent No.: US 10,217,028 B1
(45) Date of Patent: Feb. 26, 2019

(54) SYSTEM AND METHOD FOR DISTRIBUTIVE TRAINING AND WEIGHT DISTRIBUTION IN A NEURAL NETWORK

(71) Applicant: NORTHROP GRUMMAN SYSTEMS CORPORATION, Falls Church, VA (US)

(72) Inventors: Victor Y. Wang, San Diego, CA (US); Kevin A. Calcote, La Mesa, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 37 days.

(21) Appl. No.: 15/683,534

(22) Filed: Aug. 22, 2017

(51) Int. Cl.
*G06K 9/00* (2006.01)
*G06K 9/62* (2006.01)
(Continued)

(52) U.S. Cl.
CPC ....... *G06K 9/6257* (2013.01); *G06K 9/00744* (2013.01); *G06K 9/6267* (2013.01);
(Continued)

(58) Field of Classification Search
CPC ............. G06K 9/6257; G06K 9/00744; G06K 9/6267; G06N 3/0445; G06N 3/08; G06T 7/20
See application file for complete search history.

(56) References Cited

U.S. PATENT DOCUMENTS

| 7,809,506 B2 * | 10/2010 | Kuge ................ B60K 31/0008 |
| | | 701/301 |
| 2007/0021915 A1 * | 1/2007 | Breed ................ B60N 2/2863 |
| | | 701/301 |

(Continued)

FOREIGN PATENT DOCUMENTS

CN        106 446 949 A        2/2017

OTHER PUBLICATIONS

Kul et al, "Distributed and collaborative real-time vehicle detection and classification over the video streams", 2017, International Journal of Advanced Robotic Systems, pp. 1-12 (Year: 2017).*

(Continued)

*Primary Examiner* — David F Dunphy
(74) *Attorney, Agent, or Firm* — John A. Miller; Shumaker, Loop & Kendrick, LLP

(57) ABSTRACT

A system for distributive training and weight distribution in a neural network. The system includes a training facility having a training neural network that detects and classifies objects in training images so as to train weights of nodes in the training neural network, and a plurality of object detection and classification units each including an image source that provides image frames, and at least one classification and prediction neural network that identifies, classifies and indicates relative velocity of objects in the image frames. Each unit transmits its image frames to the training facility so that the training neural network further trains the weights of the nodes in the training neural network, and the trained neural network weights are transmitted from the training facility to each of the object detection and classification units so as to train weights of nodes in the at least one classification and prediction neural network.

20 Claims, 4 Drawing Sheets

(51) Int. Cl.
*G06N 3/00* (2006.01)
*G06T 7/20* (2017.01)
*G06N 3/04* (2006.01)
*G06N 3/08* (2006.01)

(52) U.S. Cl.
CPC ............ *G06N 3/0445* (2013.01); *G06N 3/08* (2013.01); *G06T 7/20* (2013.01); *G06K 9/6263* (2013.01); *G06T 2207/20081* (2013.01); *G06T 2207/20084* (2013.01)

(56) References Cited

U.S. PATENT DOCUMENTS

| | | | |
|---|---|---|---|
| 2017/0169358 A1 | 6/2017 | Choi et al. | |
| 2018/0053102 A1* | 2/2018 | Martinson | B60R 16/0232 |
| 2018/0089497 A1* | 3/2018 | Romanenko | G06K 9/00221 |
| 2018/0105186 A1* | 4/2018 | Motomura | B60W 50/14 |
| 2018/0247160 A1* | 8/2018 | Rohani | B25J 9/161 |
| 2018/0284785 A1* | 10/2018 | Berntorp | G05D 1/0214 |
| 2018/0307967 A1* | 10/2018 | Graf | G06N 3/04 |

OTHER PUBLICATIONS

Haapala, Joonas, "Recurrent Neural Networks for Object Detection in Video Sequences", Aalto University, School of Science, Degree Programme in Computer Science and Engineering, Mar. 21, 2017, 59 pgs.

Kul, Seda, Eken, Sueleyman and Sayar, Ahmet, "Distributed and Collaborative Real-Time Vehicle Detection and Classification Over the Video Streams", International Journal of Advanced Robotic Systems, Jul.-Aug. 2017, 12 pgs.

Morris, Brendan and Trivedi, Mohan, "Robust Classification and Tracking of Vehicles in Traffic Video Streams", University of California, San Diego, CA, Proceedings of the IEEE ITSC 2006, 2006 IEEE Intelligent Transportation Systems Conference, Toronto, Canada, Sep. 17-20, 2007, 6 pgs.

* cited by examiner

US 10,217,028 B1

SYSTEM AND METHOD FOR DISTRIBUTIVE TRAINING AND WEIGHT DISTRIBUTION IN A NEURAL NETWORK

BACKGROUND

Field

This invention relates to a networked system and method for distributive training a neural network so that observations from one physical location can influence and support the inference and classification performed by another networked node, where the configuration of the networked system allows for forward nodes to make labeled observations, and share and offload computational training to a back-end engine that also redistributes aggregate trained weights across the forward nodes.

Discussion

Artificial intelligence (AI) is a part of computer science that employs algorithms that allow software applications to learn from their environment and make decisions therefrom to achieve a certain result. Machine learning is a part of AI that employs software applications that acquire their own knowledge by analyzing vast amounts of raw input data in an iterative manner to extract patterns from the data and to allow the software application to learn to perform a task without being specifically programmed to perform that task. Deep learning is a particular type of machine learning that provides greater learning performance through representing a certain real-world environment as a hierarchy of increasing complex concepts.

Deep learning typically employs a software structure comprising several layers of neural networks that perform nonlinear processing, where each successive layer receives the output from the previous layer. Generally, the layers include an input layer that receives raw data from a sensor, a number of hidden layers that extract abstract features from the data, and an output layer that identifies a certain thing based on the feature extraction from the hidden layers. The neural networks include neurons or nodes that each has a "weight" that is multiplied by the input to the node to obtain a probability of whether something is correct. More specifically, each of the nodes has a weight that is a floating point number that is multiplied with the input to the node to generate an output for that node that is some proportion of the input. The weights are initially "trained" or set by causing the neural networks to analyze a set of known data under supervised processing and through minimizing a cost function to allow the network to obtain the highest probability of a correct output.

Deep learning neural networks are usually employed to provide image feature extraction and transformation for the visual detection and classification of objects in an image, where a video or stream of images can be analyzed by the network to identify and classify objects and learn through the process to better recognize the objects. Thus, in these types of networks, the system can use the same processing configuration to detect certain objects and classify them differently based on how the algorithm has learned to recognize the objects.

Deep learning algorithms and networks continue to improve as data processing capabilities increase. Specific areas of improvement include discriminators that increase the detection quality of the images and the speed at which the objects are recognized and classified.

SUMMARY

The present invention discloses and describes a system and method for distributive training and weight distribution of a neural network that capitalizes on networked observation nodes such that all networked nodes distributively provide observations and inputs for training. The system includes a training facility having a tools suite that provides training images and object labels for objects in the training images, at least one training neural network that detects and classifies the objects in the training images so as to train weights of the nodes in the at least one training neural network, and a training facility having a transceiver for distributing the trained neural network weights and receiving images. The system also includes a plurality of object detection and classification units each having an image source that provides pixilated image frames, at least one classification and prediction neural network that identifies, classifies and indicates relative velocity of objects in the image frames, and a transceiver for transmitting the image frames and receiving the trained neural network weights. Each object detection and classification unit transmits its image frames to the training facility so as to allow the at least one training neural network to further train the weights of the nodes in the at least one training neural network, and the trained neural network weights are distributed from the training facility to each of the object detection and classification units so as to train weights of nodes in the at least one classification and prediction neural network in each object detection and classification units with objects in image frames from other object detection and classification units.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for distributive training and weight distribution of the nodes in a neural network is merely exemplary in nature, and is in no way intended to limit the invention or its applications or uses.

Figure 1:
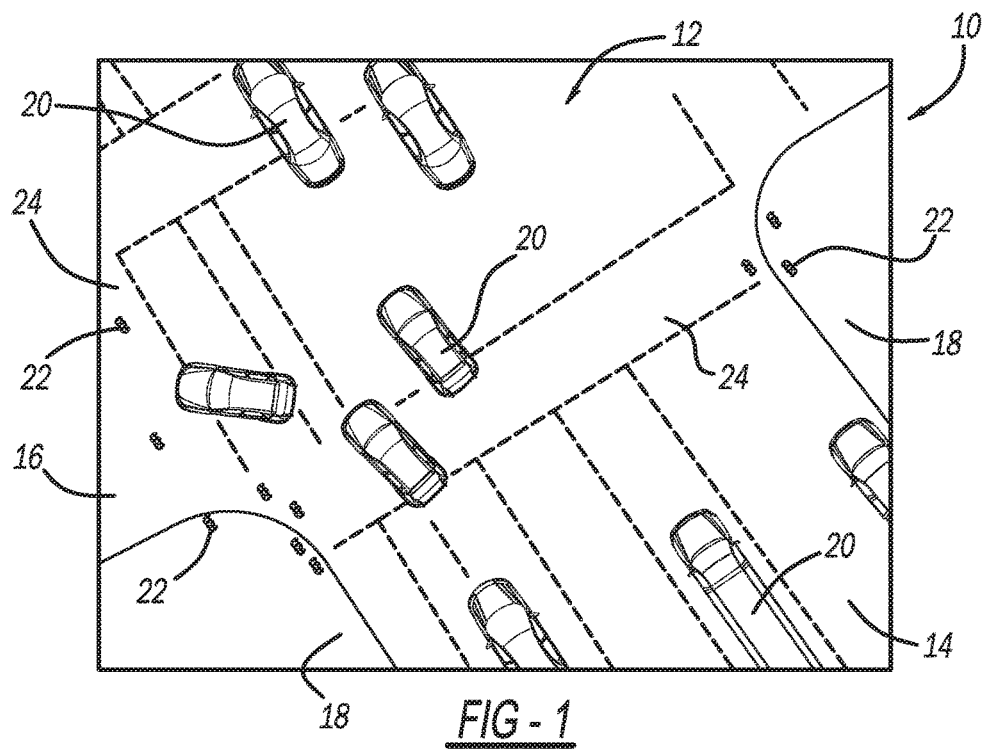
FIG. 1 is an illustration of an image.

FIG. 1 is an illustration of a pixilated two-dimensional digital image 10 showing a city intersection 12 defined by crossing roadways 14 and 16, where sidewalks 18 are provided adjacent to the roadways 14 and 16. A number of vehicles 20, including trucks, cars, etc., are shown traveling along the roadways 14 and 16 at varying speeds. Further, a number of pedestrians 22 are shown walking on the sidewalks 18 and in cross-walks 24. For the purposes of the discussion herein, the digital image 10 can be a single still image or can be a frame from a video stream of images.

As will be discussed in detail below, the present invention proposes an adaptive real-time detection and examination network (ARDEN) that employs deep learning and trained neural networks that provide detection and classification of objects in a two-dimensional digital image, for example, the vehicles 20 and the pedestrians 22 in the image 10. The network will identify objects within the digital image 10, provide their pixel based location within the image 10, and provide a probability of object detection all at a very low latency, such as less than 30 ms, for use in real-time video. The network will also predict the relative velocity of the objects that are moving in the image 10 based on their position in previous frames of images.

Figure 2:
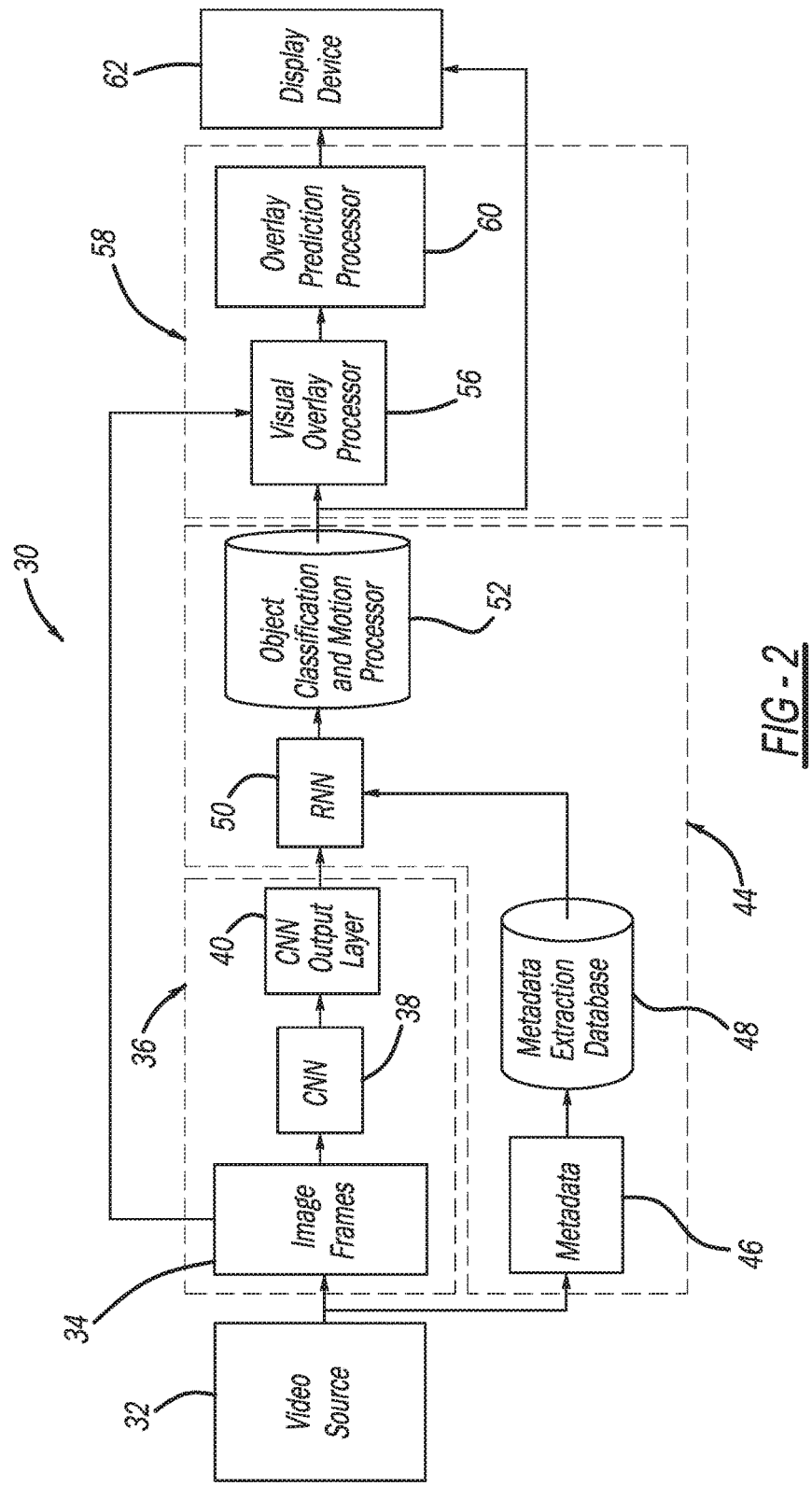
FIG. 2 is a schematic block diagram of a system for detecting and classifying objects in the image shown in FIG. 1.

FIG. 2 is a block diagram of an object detection and classification system 30 that embodies the ARDEN referred to above. The system 30 includes a video source 32 that can be any suitable device capable of generating a stream of pixilated video images or a pixilated still image, such as the image 10. Non-limiting examples of suitable video sources include a camera, an electro-optic infrared sensor, a LIDAR sensor, an X-ray machine, a magnetic resonance imaging (MRI) device, a synthetic aperture radar (SAR) device, etc. The video source 32 provides a sequence of digital image frames 34 of video data, or a still image, defined by pixel data at a certain sample rate, such as thirty frames per second. The system 30 includes a classification engine 36 that receives the video frames 34 and that identifies and classifies the objects in the frames 34. Each image frame 34 is provided to a multi-layer feed-forward convolutional neural network (CNN) 38 in the classification engine 36, where the input layer of the CNN 38 is derived from the image frames 34. As is well understood by those skilled in the art, a CNN is a neural network that employs convolutional mathematical operations instead of general matrix multiplication, and has particular application for processing a grid of values, such as an image. More specifically, the CNN 38 is a multi-layer neural network including overlapping input regions and multiple layers of receptive fields having trained and weighted nodes in each layer, where the CNN 38 specifically has an absence of fully connected layers, which supports the adaptive feature of the system 30 and allows for a more flexible resizing of the first input layer. The trained CNN weights from a lower image resolution training set can be used as a starting point for inference or training on other higher image resolutions. Each node in the CNN 38 is provided with a bias and a weight that defines how it outputs data to subsequent nodes. An output layer 40 of the CNN 38 provides the raw digital data that identifies the detected and classified objects in the image 10 and their respective location in the image 10. As will be discussed in further detail below, the detected and classified objects are identified in the image 10 by a bounding box and a label.

Figure 3:
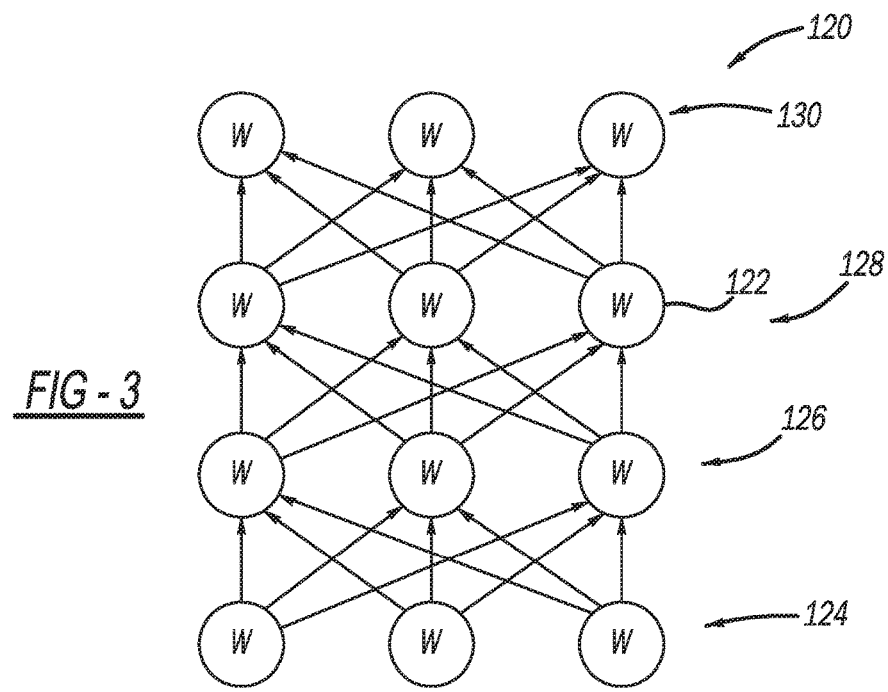
FIG. 3 is an illustration of a neural network including an input layer, hidden layers and an output layer.

FIG. 3 is an illustration of a neural network 120 including a plurality of nodes 122 each having an adjustable weight W, where the network 120 is intended to generally represent the neural networks discussed herein. The neural network 120 includes an input layer 124 that receives the individual pixel data from the image frames 34, two hidden layers 126 and 128 that identify features in the pixel data, and an output layer 130, where each node in the output layer 130 identifies one of the objects.

Many of the objects within the image 10 are moving. Therefore it may be desirable to identify the relative velocity of the moving objects, the direction of the moving objects, and a prediction of where those moving objects will be in subsequent image frames based on their relative velocity and direction in previous image frames, as well as patterns derived from the neural network learning. The prediction of the location of the moving objects also includes predicting the location of those objects, such as a vehicle turning, that may not be moving in a linear motion.

The system 30 includes a prediction engine 44 to provide these functions. The video source 32 provides metadata represented by box 46 that is received by the prediction engine 44, where the metadata 46 includes various and specific information for the particular application, such as the location of the video source 32, i.e., its GPS coordinates, time of day, weather conditions, battery life, etc., and where the metadata 46 is correlated to the image frames 34 in time. The metadata 46 is provided to a metadata extraction database 48 in the prediction engine 44 that selects those pieces of the metadata 46 that are desirable for the object location prediction process for the specific location. In one embodiment, the metadata extraction database 48 uses the same input layer that is derived from the image frames 34 that is provided as the input layer for the CNN 38.

The raw object classification data from the output layer 40 and the extracted metadata from the database 48 are sent to a recurrent neural network (RNN) 50 in the prediction engine 44 that determines the relative velocity and direction of the objects in the image frames 34 based on where the objects were in previous image frames 34. As is known by those skilled in the art, a recurrent neural network is a class of artificial neural networks, also including multiple layers having trained and weighted nodes, that has particular application for processing sequential data, where connections between nodes form a directed cycle. The configuration of the RNN 50 creates an internal state of the network that allows it to exhibit dynamic temporal behavior, where unlike feed-forward neural networks, RNNs can use their internal memory to process an arbitrary sequences of inputs. In one embodiment, the RNN 50 is designed using a long short-term memory (LSTM) architecture known to those skilled in the art. The RNN 50 provides a fusion of the content from the metadata extraction database 48 and the CNN output layer 40 to create metadata that contains object classification, prediction of angle (direction) of each classified object, prediction of the location of objects that may not be moving in a linear manner, prediction of the relative velocity of each classified object, which will be in units only meaningful to the input layer, such as pixels per metric unit of time, and a translation of pixels per metric unit of time into GPS coordinates, or other coordinate system based units of movement, depending on the availability of the metadata.

It is noted that as described the RNN 50 includes an internal memory state that allows it to use previous image frames 34 in combination with the current image frame 34 to provide the relative velocity of the classified objects. If the system 30 is only processing a single still image from the source 32, then previous image frames are not available, and thus, the RNN 50 is unable to provide an indication of the relative velocity of the objects.

The data generated by the RNN 50 identifying the motion of the objects in the image frames 34 that were identified by the classification engine 36 is then sent to an object classification and motion vector metadata processor 52 in the prediction engine 44 that combines the detection of the objects in the image frames 34 provided by the CNN 38 with the motion of those objects determined by the RNN 50. The combination of data including object location and object relative velocity is then provided along with the image frames 34 to a visual overlay of object classification and motion vector metadata processor 56 in a visualization engine 58 that provides bounding boxes around each detected object in the frames 34 and an indication of object relative velocity and predicted future location. That correlation is provided to an image frame and classification overlay and motion vector object prediction processor 60 in the visualization engine 58 that generates an image indicating the location and relative velocity of the objects in the image 10. That image and the combination of data including object location and object relative velocity from the processor 52 is provided to a display device 62 to display the image. The display device 62 can be any display device suitable for the purposes described herein, such as a monitor, head-up display (HUD), goggles, projector, smart phone, computer, etc.

Figure 4:
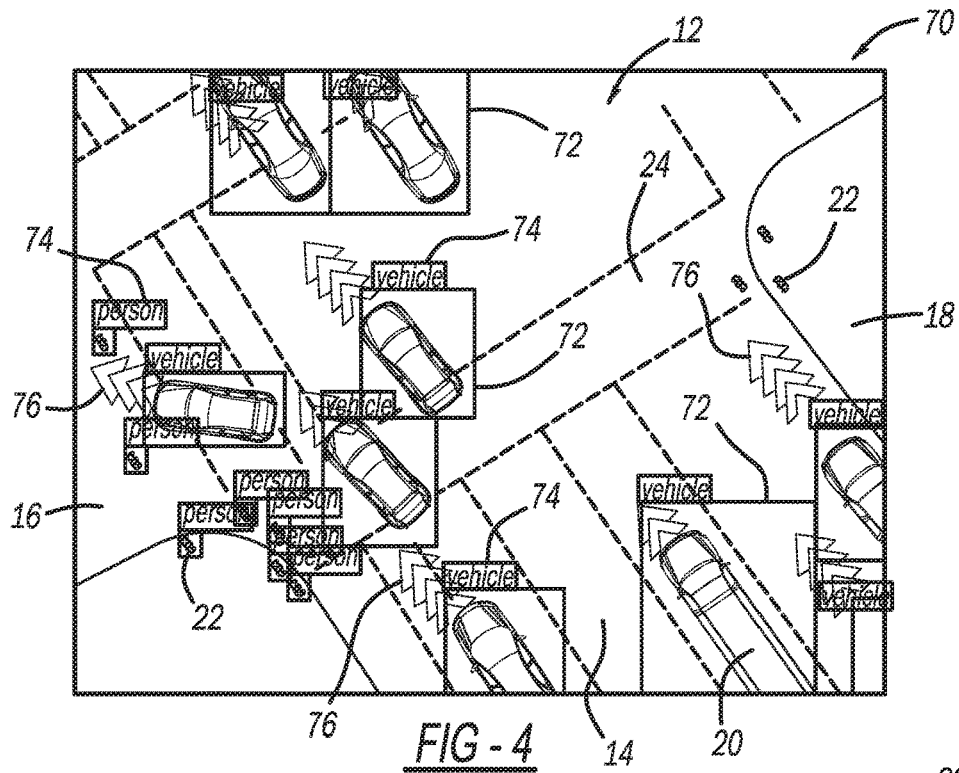
FIG. 4 is an illustration of the image shown in FIG. 1 that has been processed by the system shown in FIG. 2 and that includes bounding boxes and labels around objects that have been classified in the image and chevrons associated with each object that is moving, where the number of chevrons indicates the relative velocity of the object.

FIG. 4 is an illustration of an image 70 that is an example of what might be displayed on the display device 62 by processing of the image 10 through the system 30, as described. In the image 70, each of the objects identified and classified is surrounded by a bounding box 72 indicating that it has been identified and classified and includes a label 74 identifying its classification, i.e., vehicle, person, etc. For each of the classified objects that is in motion, a number of chevrons 76 are provided in association with the bounding box 72, where the direction of the chevrons 76 indicates the direction of travel of the object, and the number of the chevrons 76 indicates the relative velocity of the object.

Figure 5:
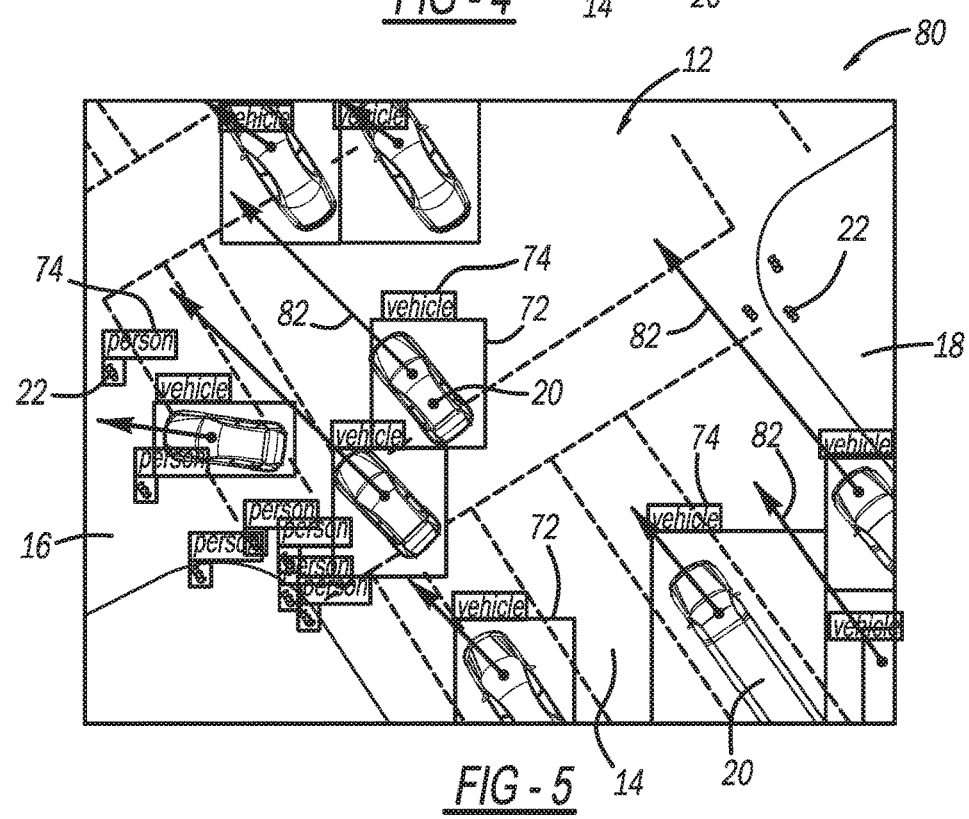
FIG. 5 is an illustration of the image shown in FIG. 1 that has been processed by the system shown in FIG. 2 and that includes bounding boxes and labels around objects that have been classified in the image and arrows associated with each object that is moving, where the length of the arrow indicates the relative velocity of the object.

FIG. 5 is an illustration of an image 80 that is another example of what might be displayed on the display device 62 by processing of the image 10 through the system 30 that includes the bounding boxes 72 around each of the objects and the labels 74 identifying the objects. However, instead of the chevrons 76, the image 80 includes arrows 82 indicating the direction of movement of the objects and the relative velocity of the objects, where the length of the arrow 82 indicates the relative velocity.

As is well understood by those skilled in the art, it is necessary to train a neural network for the purposes discussed herein so as to provide appropriate weights for each of the nodes in the CNN 38 and the RNN 50. Such training is supervised and typically requires a technician who initially identifies objects in the image, provides initial weights for the nodes, and then evaluates and corrects the outputs of the network all off-line so that the weights are properly trained for use in the field. As will be discussed in detail below, the present invention also includes a system whereby an object detection and classification system of the type shown in FIG. 2 that already includes trained nodes in the CNN 38 and the RNN 50 can have those nodes revised and updated by a training system that receives images from other object detection and classification systems, where the training system uses those images to further train a representative neural network.

Figure 6:
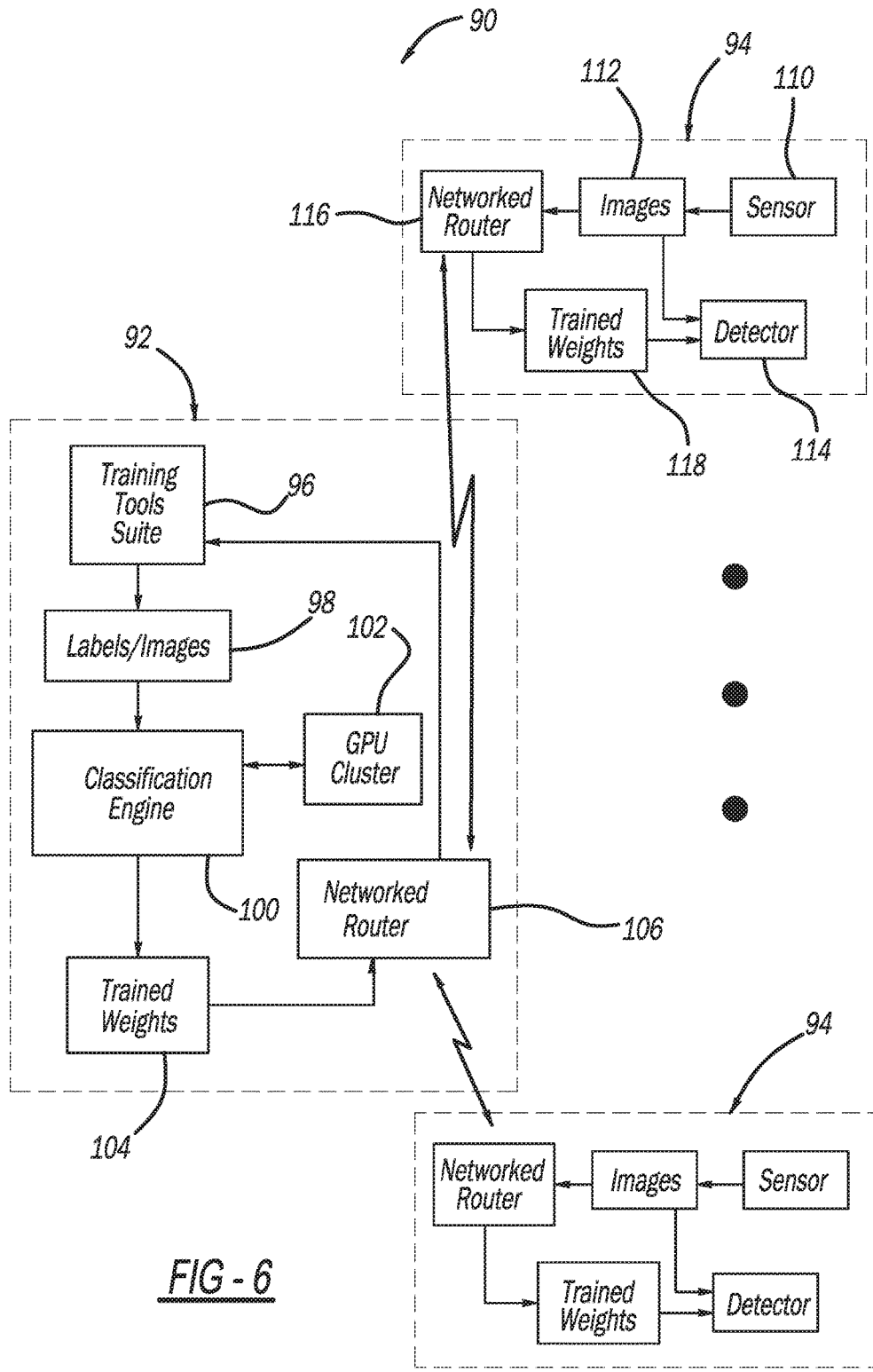
FIG. 6 is a schematic block diagram of a system for providing machine learning and training for the neural networks that are part of the system shown in FIG. 2.

FIG. 6 is a schematic block diagram of an object detection network 90 that provides distributive training and weight distribution of the nodes in a neural network, i.e., the weights are distributed among the nodes, illustrating this feature of the present invention. The network 90 includes a training system 92 located at a training facility and a plurality of object detection and classification systems 94 located separate from the training system 92 and being used in the field, where the systems 94 are similar to the system 30. It is noted that the number of the systems 94 can be any suitable number of two or more. The training system 92 includes a training tools suite 96 that is a computer system operating suitable algorithms and the necessary accessories, all of which are well known to those skilled in the art. A technician will inspect a set of training images including objects that may be images to be classified by the systems 94 using the tools suite 96 and will draw bounding boxes around the objects in the training images and will classify them, where the technician identifies the classified objects by labels representing the objects. The labels and images, represented by box 98, are provided to a classification and prediction engine 100 that includes a training CNN and RNN that are the same or similar networks used in the systems 94 that are to be trained. The engine 100 also includes an evaluation and back propagation feature that are used to adjust the value of the weights for the nodes in the CNN and the RNN therein to more accurately cause it to classify objects in other images. More specifically, the weights are evaluated in a controlled manner so that the training CNN and RNN classifies objects correctly as the weights are being adjusted, where the weights have the property of being static data that can be extracted, saved, transferred and refined through an evaluation function and recursively updated during that propagation while training. The classification and prediction engine 100 provides data to and receives data from a graphical processing unit (GPU) cluster 102, whose operation is well understood to those skilled in the art, that provides parallel data processing to increase data throughput. Once the evaluation process is complete and the engine 100 determines that the weights provide a high predictability of identifying and classifying the objects that it has been trained for, the weights are output from the engine 100 as trained weights 104. The training system 92 also includes a suitable transceiver or networked router 106 for transmitting the trained weights 104 and receiving images.

Each object detection and classification system 94 includes a sensor 110, intended to represent the video source 32, that generates images 112 that are provided to a detector 114 intended to represent the combined classification engine 36, the prediction engine 44 and the visualization engine 58. Each system 94 also includes a suitable transceiver or networked router 116 that allows it to be in wireless communication with the networked router 106 in the system 92, where the networked router 116 also receives the images 112 from the sensor 110. Although this embodiment shows the networked routers 106 and 116 in wireless communication with each other, it is noted that any suitable communications configuration can be employed. The images 112 are sent by the networked router 116 to the training system 92 where they are provided to the tools suite 96 and then to the classification and prediction engine 100 for further training of the weights for the nodes in the training CNN and RNN to help detect objects that are at the location of the specific system 94. Further, the networked router 116 is capable of receiving the trained weights 104 from the system 92, which are provided to the detector 114 at box 118 to update the weights in the CNN and RNN in the detector 114. Therefore, adaptively trained weights using images from one of the systems 94 can be used to update the weights for the nodes in the CNN and RNN in another one of the systems 94 so that the detector 114 in that system 94 can be trained to classify objects that may not be in the images received by that system 94.

The several and various steps and processes discussed herein to describe the invention may be referring to operations performed by a computer, a processor or other electronic calculating device that manipulate and/or transform data using electrical phenomenon. Those computers and electronic devices may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A system for distributive training and weight distribution of nodes in a neural network, said system comprising:
    a training facility including a tools suite that provides training images and object labels for objects in the training images, at least one training neural network that detects and classifies the objects in the training images so as to train weights of nodes in the at least one training neural network, and a training facility transceiver for distributing the trained neural network weights and receiving images; and
    a plurality of object detection and classification units each including an image source that provides pixilated image frames, at least one classification and prediction neural network that identifies, classifies and indicates relative velocity of objects in the image frames, and a unit transceiver for transmitting the image frames and receiving the trained neural network weights, wherein each object detection and classification unit transmits its image frames to the training facility so as to allow the at least one training neural network to further train the weights of the nodes in the at least one training neural network, and wherein the trained neural network weights are distributed from the training facility to each of the object detection and classification units so as to train weights of nodes in the at least one classification and prediction neural network in each object detection and classification units with objects in image frames from other object detection and classification units.

2. The system according to claim 1 wherein the at least one training neural network includes a multi-layer feed-forward convolutional neural network (CNN) and a recurrent neural network (RNN).

3. The system according to claim 1 wherein the at least one classification and prediction neural network in each object detection and classification unit includes a multi-layer feed-forward convolutional neural network (CNN) and a recurrent neural network (RNN).

4. The system according to claim 3 wherein the CNN specifically has an absence of fully connected layers.

5. The system according to claim 3 wherein the RNN includes a long short-term memory.

6. The system according to claim 3 wherein the CNN is provided in a classification engine, said CNN including an input layer and an output layer, said CNN being responsive to the image frames at the input layer, and identifying and classifying objects in the image frames and providing object classification data in the output layer.

7. The system according to claim 6 wherein the image source also provides metadata and the RNN is provided in a prediction engine, said RNN being responsive to the object classification data in the output layer and the metadata, said RNN identifying motion and relative velocity of the classified objects in the image frames and providing object motion data, said prediction engine further including an object classification and motion vector processor that combines the object classification data from the CNN and the object motion data from the RNN.

8. The system according to claim 7 wherein each of the object detection and classification units further includes a visualization engine that is responsive to the image frames and the combined object classification data and the object motion data from the prediction engine, said visualization engine correlating the combined object classification data and the object motion data with the image frames to provide correlated images that include boundary boxes around each classified object and an indicator of relative velocity and direction of movement of the classified objects, wherein each of the object detection and classification units also includes a display device for displaying the correlated images.

9. The system according to claim 8 wherein the display device is selected from the group consisting of a monitor, a head-up display (HUD) device, goggles, projectors, smart phones and computers.

10. The system according to claim 1 wherein the at least one classification and prediction neural network predicts a future location of objects that are turning.

11. The system according to claim 1 wherein the image source is selected from the group consisting of cameras, electro-optic infrared sensors, LIDAR sensors, X-ray devices, magnetic resonance imaging (MRI) devices and synthetic aperture radar (SAR) devices.

12. A system for distributive training and weight distribution of nodes in a neural network, said system comprising:
    a training facility including at least one training neural network that detects and classifies the objects in training images so as to train weights of nodes in the at least one training neural network; and
    a plurality of object detection and classification units each including at least one classification and prediction neural network that identifies, classifies and indicates relative velocity of objects in image frames, wherein each object detection and classification unit transmits its image frames to the training facility so as to allow the at least one training neural network to further train the weights of nodes in the at least one training neural network, and wherein the trained neural network weights are distributed from the training facility to each of the object detection and classification units so as to train weights of nodes in the at least one classification and prediction neural network in each object detection and classification units with image objects from other object detection and classification units.

13. The system according to claim 12 wherein the at least one training neural network includes a multi-layer feed-forward convolutional neural network (CNN) and a recurrent neural network (RNN).

14. The system according to claim 12 wherein the at least one classification and prediction neural network in each object detection and classification unit includes a multi-layer feed-forward convolutional neural network (CNN) and a recurrent neural network (RNN).

15. The system according to claim 14 wherein the CNN specifically has an absence of fully connected layers.

16. The system according to claim 14 wherein the RNN includes a long short-term memory.

17. A method for distributive training and weight distribution of nodes in a neural network, said method comprising:

providing training images;

training weights of nodes in a training neural network using the training images;

identifying, classifying and indicating relative velocity of objects in image frames at a plurality of locations using at least one classification and prediction neural network at each location;

distributing the trained weights to each location to train weights of nodes in the at least one classification and prediction neural network at each location; and transmitting the image frames from each location to the training neural network to further train the weights of the nodes in the training neural network.

18. The method according to claim 17 wherein the training neural network includes a multi-layer feed-forward convolutional neural network (CNN) and a recurrent neural network (RNN).

19. The method according to claim 17 wherein the at least one classification and prediction neural network at each location includes a multi-layer feed-forward convolutional neural network (CNN) and a recurrent neural network (RNN).

20. The method according to claim 19 wherein the CNN specifically has an absence of fully connected layers.

* * * * *